US009042726B2

(12) United States Patent
Togo et al.

(10) Patent No.: US 9,042,726 B2
(45) Date of Patent: May 26, 2015

(54) OPTICAL TRANSPORT NETWORK SYSTEM, OPTICAL-SIGNAL TRANSMISSION PATH SELECTING METHOD, AND OPTICAL TRANSMISSION DEVICE

(71) Applicant: FUJITSU LIMITED, Kawasaki (JP)

(72) Inventors: Toshihiro Togo, Kawasaki (JP); Yasuko Nozu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 13/686,137

(22) Filed: Nov. 27, 2012

(65) Prior Publication Data

US 2013/0084068 A1 Apr. 4, 2013

Related U.S. Application Data

(63) Continuation of application No. PCT/JP2010/059037, filed on May 27, 2010.

(51) Int. Cl.
*H04J 14/00* (2006.01)
*H04J 14/02* (2006.01)

(52) U.S. Cl.
CPC ......... *H04J 14/0227* (2013.01); *H04J 14/0257* (2013.01); *H04J 14/0269* (2013.01); *H04J 14/0284* (2013.01)

(58) Field of Classification Search
CPC .............. H04J 14/0227; H04J 14/0241; H04J 14/0284; H04J 43/0811; H04J 14/0228; H04J 14/02; H04J 14/00; H04J 14/023; H04J 14/0257; H04J 14/0269
USPC .......................................................... 398/49
See application file for complete search history.

(56) References Cited

U.S. PATENT DOCUMENTS 5,675,429 A * 10/1997 Henmi et al. ................. 398/178
RE37,621 E * 4/2002 Henmi et al. ................. 398/178
(Continued)

FOREIGN PATENT DOCUMENTS

| CA | 2418384 | 8/2003 |
| JP | 06-085758 | 3/1994 |

(Continued)

OTHER PUBLICATIONS

International Search Report, mailed Aug. 17, 2010, in corresponding International Application No. PCT/JP2010/059037 (9 pp.).

*Primary Examiner* — Ken Vanderpuye
*Assistant Examiner* — Abbas H Alagheband
(74) *Attorney, Agent, or Firm* — Staas & Halsey LLP

(57) ABSTRACT

An optical transport network system includes a plurality of NEs, each transmitting wavelength-multiplexed optical signals. Each NE includes a routing information DB that is used to store reachable area information, which contains identifiers of other NEs in a range within which the optical signals can be transmitted from the own NE without using an REG. A FROM NE includes a path candidate searching unit that searches for a plurality of path candidates for transmitting optical signals from the FROM NE to a TO NE. The TO NE includes a path selecting unit that selects a path for transmitting optical signals from among a plurality of path candidates. The path selecting unit obtains the number of times for which the REG is used for each of the plurality of path candidates; and, based on each number of times that is obtained, selects a path for transmitting the optical signals.

6 Claims, 14 Drawing Sheets

(56) References Cited

U.S. PATENT DOCUMENTS

| | | | |
|---|---|---|---|
| 7,283,741 B2* | 10/2007 | Sadananda | 398/5 |
| 7,477,843 B1* | 1/2009 | Peeters et al. | 398/57 |
| 8,515,280 B1* | 8/2013 | Li et al. | 398/58 |
| 2002/0018269 A1* | 2/2002 | Chaudhuri et al. | 359/165 |
| 2002/0030864 A1* | 3/2002 | Chaudhuri et al. | 359/110 |
| 2002/0063915 A1* | 5/2002 | Levandovsky et al. | 359/110 |
| 2003/0147645 A1* | 8/2003 | Imajuku et al. | 398/7 |
| 2005/0008014 A1* | 1/2005 | Mitra et al. | 370/392 |
| 2005/0069314 A1* | 3/2005 | De Patre et al. | 398/5 |
| 2006/0067694 A1* | 3/2006 | Nozu | 398/83 |
| 2008/0298805 A1* | 12/2008 | Lee et al. | 398/48 |
| 2009/0116836 A1* | 5/2009 | Bernstein et al. | 398/51 |
| 2009/0142056 A1* | 6/2009 | Bernstein et al. | 398/49 |
| 2009/0162060 A1* | 6/2009 | Vasseur et al. | 398/49 |
| 2010/0142943 A1* | 6/2010 | Frankel et al. | 398/25 |

FOREIGN PATENT DOCUMENTS

| | | |
|---|---|---|
| JP | 2003-234823 | 8/2003 |
| JP | 2003-333082 | 11/2003 |
| JP | 2003-333086 | 11/2003 |
| JP | 2004-048477 | 2/2004 |
| JP | 2005-229554 | 8/2005 |
| WO | 2005/032076 | 4/2005 |

* cited by examiner

FIG.5

| | | | 400 |
|---|---|---|---|
| 400-1 | NE NUMBER OF OWN NE | | 1, 2, ... n |
| 400-2 | REACHABLE AREA NUMBER TO WHICH OWN NE BELONGS | | 1, 2, ... a |
| 400-3 | UNUSED WAVELENGTH NUMBER FOR EACH FIBER ROUTE | ROUTE 1 | Ch1, 2, ... c, NA |
| | | ROUTE 2 | Ch1, 2, ... c, NA |
| | | ... | ... |
| | | ROUTE d | Ch1, 2, ... c, NA |
| 400-4 | "TO NE" NUMBER FOR EACH FIBER ROUTE AND REACHABLE AREA NUMBER TO WHICH "TO NE" BELONGS | ROUTE 1 | <NE n>-<AREA #a (MULTIPLE)> |
| | | ROUTE 2 | <NE n>-<AREA #a (MULTIPLE)> |
| | | ... | ... |
| | | ROUTE d | <NE n>-<AREA #a (MULTIPLE)> |
| 400-5 | PATH PATTERN INFORMATION OF CONVERGED PATHS IN NETWORK | FROM-TO NE 1-n | PATH 1 | <NE 1>-<NE 2>...<NE n> |
| | | | ... | ... |
| | | | PATH r | <NE 1>-<NE 2>...<NE n> |
| | | FROM-TO NE N-n | PATH 1 | <NE 1>-<NE 2>...<NE n> |
| | | | ... | ... |
| | | | PATH r | <NE 1>-<NE 2>...<NE n> |

FIG.6

| | INFORMATION | MEANING | DATA |
|---|---|---|---|
| 500-1 | PATH PATTERN INFORMATION | CREATED BY "FROM NE", USED FOR COMMUNICATION OF FIXED VALUE | <DEMAND ID>-<PATH NUMBER l> |
| 500-2 | REACHABLE AREA NUMBER | AREA ALLOCATED AT THAT POINT IN TIME, VARIABLE | 1, 2, ... a |
| 500-3 | USABLE WAVELENGTHS | UNUSED WAVELENGTH IN ROUTE TOWARD SUBSEQUENT NE, VARIABLE | Ch1, 2, ... c, NA |
| 500-4 | ALLOCATED REG COUNT THROUGH THE PATH | NUMBER OF TIMES FOR WHICH REACHABLE AREA NUMBER IS CHANGED, VARIABLE | 1, 2, ... |
| 500-5 | WAVELENGTH CONVERSION REG COUNT | NUMBER OF TIMES FOR WHICH WAVELENGTH CONVERSION IS PERFORMED BY THEN, VARIABLE | 1, 2, ... |
| 500-6 | NON-TRANSMITTABLE CONDITION FLAG | INDICATE NON-TRANSMITTABLE PATH DUE TO LACK OF FREE WAVELENGTH, VARIABLE | 0 or 1 |
| 500-7 | USED WAVELENGTH | WAVELENGTHS THAT ARE ESTABLISHED (ACTUALLY USED), WAVELENGTH, VARIABLE | Ch1, 2, ... c |
| 500-8 | AREA CONVERSION REG FLAG | INSTRUCTING ADJACENT NE THAT REG NEEDS TO BE INSERTED WHILE ESTABLISHING PATH, VARIABLE | 0 or 1 |

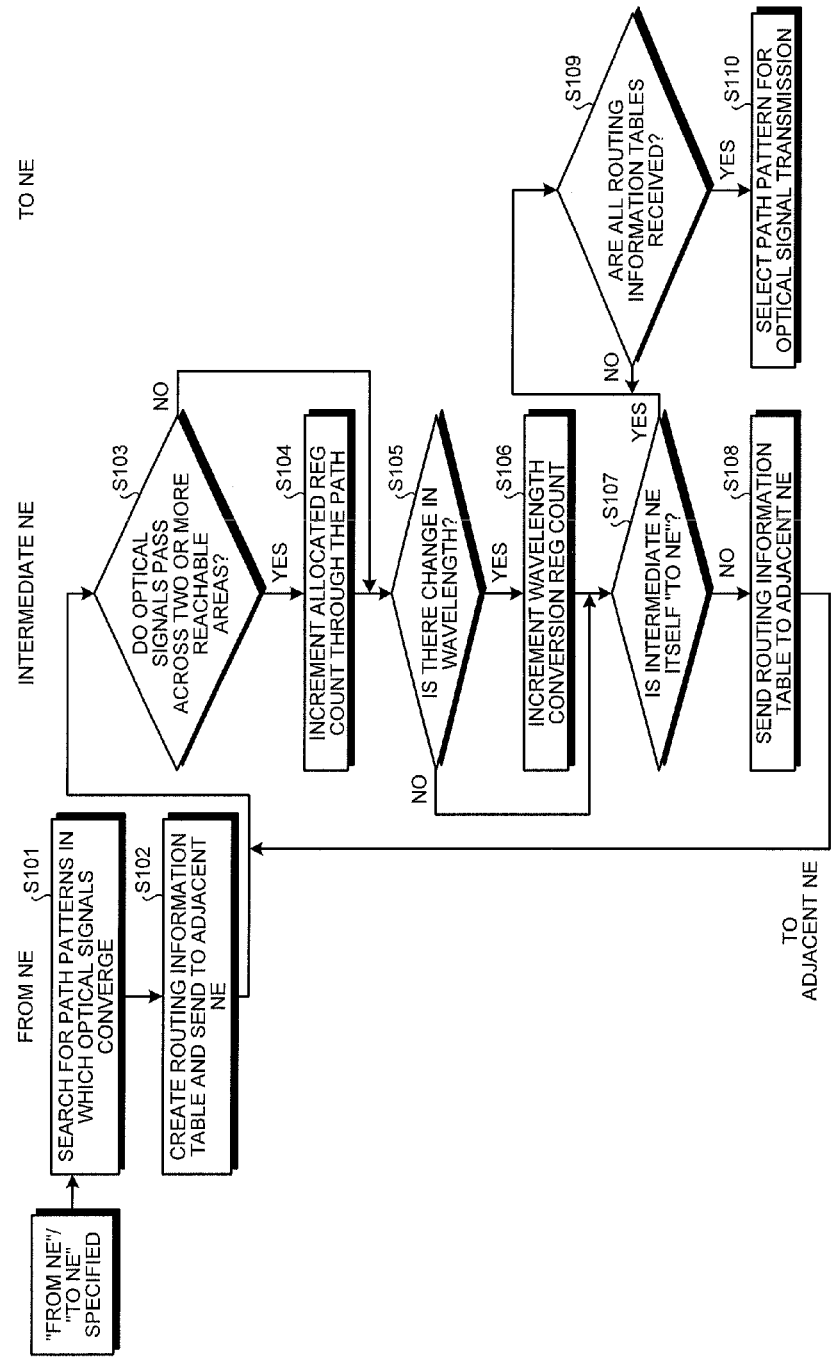

FIG.8

| | INFORMATION | METHOD OF GENERATION |
|---|---|---|
| 500-1 | PATH PATTERN INFORMATION | CREATED BY "FROM NE", FIXED |
| 500-2 | REACHABLE AREA NUMBER | AREA NUMBER TO WHICH OWN NE BELONGS |
| 500-3 | USABLE WAVELENGTHS | UNUSED WAVELENGTH IN ROUTE TOWARD SUBSEQUENT NE |
| 500-4 | ALLOCATED REG COUNT THROUGH THE PATH | 0 (ZERO) |
| 500-5 | WAVELENGTH CONVERSION REG COUNT | 0 (ZERO) |
| 500-6 | NON-TRANSMITTABLE CONDITION FLAG | "0 (ZERO)" IF UNUSED WAVELENGTH IS PRESENT, "1" IF UNUSED WAVELENGTH IS NOT PRESENT |
| 500-7 | USED WAVELENGTH | UNUSED |
| 500-8 | AREA CONVERSION REG FLAG | UNUSED |

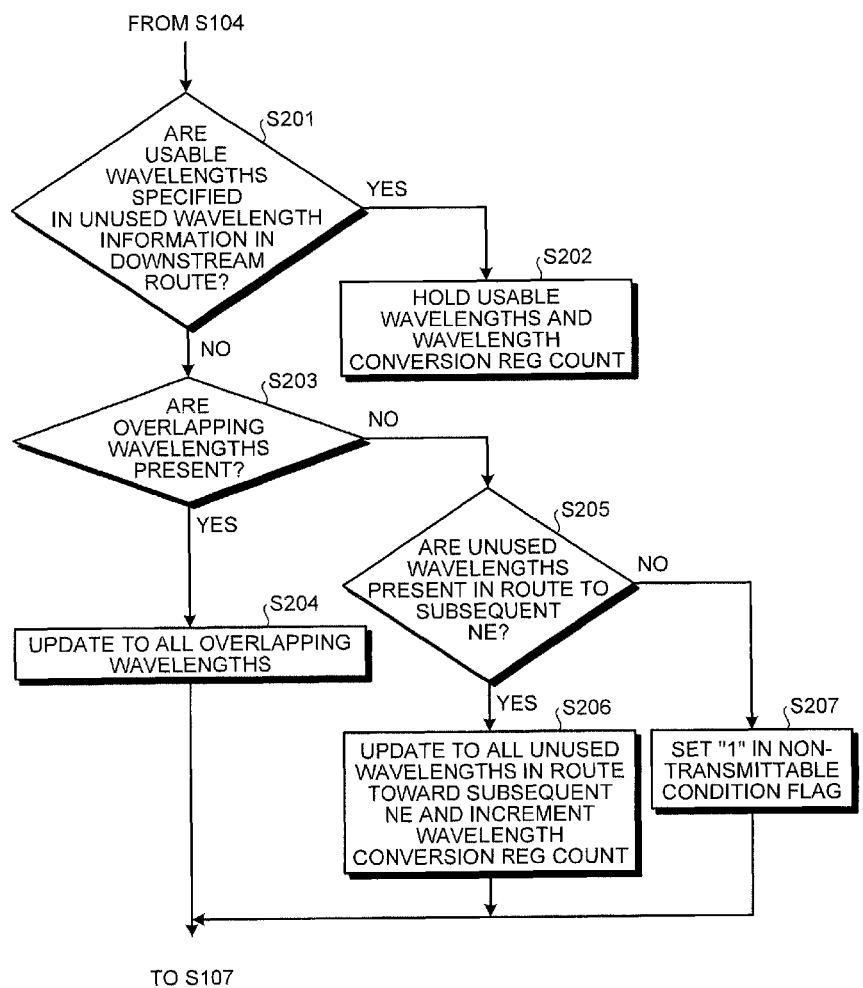

FIG.12

| REACHABLE AREA NUMBER | DEFINITION | NEs BELONGING TO AREA |
|---|---|---|
| 1 | SET OF NEs, STARTING FROM N1, CAPABLE OF PERFORMING TRANSMISSION WITHOUT REG | N1, N2, N3, N4 |
| 2 | SET OF NEs, STARTING FROM N2, CAPABLE OF PERFORMING TRANSMISSION WITHOUT REG | N1, N2, N3, N4, N5 |
| 3 | SET OF NEs, STARTING FROM N3, CAPABLE OF PERFORMING TRANSMISSION WITHOUT REG | N1, N2, N3, N4, N5 |
| 4 | SET OF NEs, STARTING FROM N4, CAPABLE OF PERFORMING TRANSMISSION WITHOUT REG | N1, N2, N3, N4, N5, N6, N7 |
| 5 | SET OF NEs, STARTING FROM N5, CAPABLE OF PERFORMING TRANSMISSION WITHOUT REG | N2, N3, N4, N5, N6, N7, N8 |
| 6 | SET OF NEs, STARTING FROM N6, CAPABLE OF PERFORMING TRANSMISSION WITHOUT REG | N4, N5, N6, N7, N8 |
| 7 | SET OF NEs, STARTING FROM N7, CAPABLE OF PERFORMING TRANSMISSION WITHOUT REG | N4, N5, N6, N7, N8 |
| 8 | SET OF NEs, STARTING FROM N8, CAPABLE OF PERFORMING TRANSMISSION WITHOUT REG | N5, N6, N7, N8 |

FIG.13

| NE | REACHABLE AREA TO WHICH NE BELONGS |
|---|---|
| 1 | 1, 2, 3, 4 |
| 2 | 1, 2, 3, 4, 5 |
| 3 | 1, 2, 3, 4, 5 |
| 4 | 1, 2, 3, 4, 5, 6, 7 |
| 5 | 2, 3, 4, 5, 6, 7, 8 |
| 6 | 4, 5, 6, 7, 8 |
| 7 | 4, 5, 6, 7, 8 |
| 8 | 5, 6, 7, 8 |

FIG.14

| FROM | N1 | N2 | N4 | N3 | N4 | N4 | N5 | N6 | N8 | N7 |
|---|---|---|---|---|---|---|---|---|---|---|
| TO | N2 | N4 | N3 | N1 | N7 | N5 | N6 | N8 | N7 | N5 |
| ch1 | Used | | Used | | | | Used | Used | Used | Used |
| ch2 | Used | | Used | | | | Used | Used | Used | Used |
| ch3 | Used | | | | Used | | Used | | Used | |
| ch4 | Used | | | | Used | | Used | | Used | |
| ch5 | | Used | Used | Used | Used | Used | | Used | | Used |
| ch6 | | Used | Used | Used | Used | Used | | Used | | Used |
| ch7 | | Used | | Used | Used | Used | | Used | | |
| ch8 | | Used | | Used | Used | Used | | Used | | |

FIG.15

OPTICAL TRANSPORT NETWORK SYSTEM, OPTICAL-SIGNAL TRANSMISSION PATH SELECTING METHOD, AND OPTICAL TRANSMISSION DEVICE

CROSS-REFERENCE TO RELATED APPLICATION

This application is a continuation application of International Application PCT/JP2010/059037, filed on May 27, 2010, and designating the U.S., the entire contents of which are incorporated herein by reference.

FIELD

The present invention relates to an optical transport network system, an optical-signal transmission path selecting method, and an optical transmission device.

BACKGROUND

Typically, it is known that, in optical transport network systems, Wavelength Division Multiplexing (WDM) is implemented so as to multiplex optical signals having a plurality of different wavelengths and transmit the multiplexed signal through a single optical fiber. In such an optical transport network system, a plurality of optical transmission devices is installed for transmitting wavelength-multiplexed optical signals.

In an optical transport network system, at the time of setting transmission paths via which optical signals are to be transmitted between optical transmission devices; the transmission paths are selected by calculating whether or not the optical parameters requested by the optical transport network system are satisfied, so as to ensure what is called reachability of optical signals. For that reason, in an optical transport network system, every time a routing request is issued; complex processes related to the network design, such as determining whether or not the optical parameters are satisfied, are performed. Meanwhile, the optical parameters point to, for example, the effect on signals by optical loss/chromatic dispersion/PMD (Polarization Mode Dispersion).
Patent Literature 1: International Publication Pamphlet No. WO 2005/032076

However, in a typical optical transport network system; the mechanism of an optical transmission device autonomously selecting a transmission path for optical signal transmission is not taken into consideration.

That is, in a typical optical transport network system, since calculating the reachability of optical signals requests a heavy processing load, the reachability calculation is performed using an Off-Line tool that is installed in an element manager which manages a plurality of optical transmission devices. Thus, in a typical optical transport network system, every time a routing request is issued; the transmission path for optical signal transmission is selected using the Off-Line tool, and the selection result is set in the optical transmission devices. Therefore, there are times when the operation of selecting the transmission path for optical signal transmission is complex.

SUMMARY

According to an aspect of the embodiments, an optical transport network system includes: a plurality of optical transmission devices each transmitting wavelength-multiplexed optical signals, wherein each of the plurality of optical transmission devices includes a memory unit that is used to store reachable area information, which contains identifiers of other optical transmission devices present in a range within which the optical signals can be transmitted from corresponding optical transmission device without using a regenerator, a source optical transmission device that is specified from among the plurality of optical transmission devices as a source of transmitting the optical signals includes a path candidate searching unit that searches for a plurality of path candidates for transmitting the optical signals from the source optical transmission device to a destination optical transmission device that is specified from among the plurality of optical transmission devices as a destination of the transmitted optical signals, and the destination optical transmission device includes a path selecting unit that, based on the reachable area information stored in the memory unit of the source optical transmission device and stored in the memory unit of an intermediate optical transmission device that passes through the optical signals in the plurality of path candidates, obtains the number of times for which the regenerator is used for each of the plurality of path candidates and, based on each number of times that is obtained, selects a path for transmitting the optical signals from among the plurality of path candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for explaining the data that is held by an NE for the purpose of autonomous routing;

FIG. 6 is a diagram illustrating a configuration of a routing information table;

FIG. 7 is a flowchart for explaining sequences of operations performed during a path searching operation in the optical transport network system according to the present embodiment;

FIG. 8 is a diagram illustrating a configuration of a routing information table created by a FROM NE;

FIG. 9 is a diagram for concretely explaining the operations performed by an intermediate NE at Step S105 and Step S106;

FIG. 12 is a diagram illustrating an exemplary table regarding reachable area numbers in the optical transport network system;

FIG. 13 is a diagram illustrating a table regarding NE identifiers in the optical transport network system;

FIG. 14 is a diagram illustrating an exemplary unused wavelength status of optical signals from a FROM NE to a TO NE; and FIG. 15 is a diagram illustrating exemplary transition states of the routing information table in the optical transport network system.

DESCRIPTION OF EMBODIMENTS

An exemplary embodiment of an optical transport network system, an optical-signal transmission path selecting method, and an optical transmission device disclosed in the application concerned is described in detail with reference to the accompanying drawing. However, the disclosure is not limited to the present embodiment described below.

Embodiment

Figure 1:
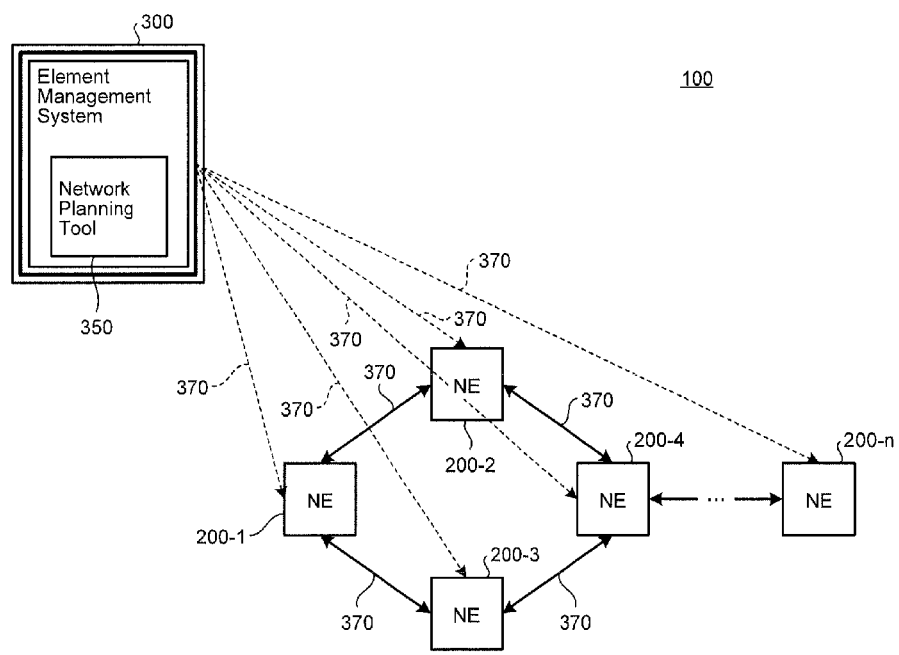
FIG. 1 is a diagram illustrating an overall configuration of an optical transport network system according to an embodiment.

FIG. 1 is a diagram illustrating an overall configuration of an optical transport network system according to the present embodiment. An optical transport network system 100 includes a plurality of network elements (NEs) 200-1 to 200-n. Each of the NE 200-1 to the NE 200-n transmits wavelength-multiplexed optical signals. Herein, "n" is a positive integer equal to or greater than two. The NE 200-1 to the NE 200-n are connected to each other in a communicable manner via a communication channel 370. The communication channel uses, for example, a different wavelength from those of main signals. Meanwhile, the optical transport network system 100 also includes an element management system 300 that manages the NE 200-1 to the NE 200-n. The element management system 300 is connected to each of the NE 200-1 to the NE 200-n in a communicable manner via the communication channel 370. Moreover, the element management system 300 includes a network planning tool 350 that functions as an Off-line tool.

The network planning tool 350 obtains reachable area information from each of the NE 200-1 to the NE 200-n. Each set of reachable area information contains identifiers of other NEs present in the range within which optical signals can be transmitted without using a regenerator (RE Generator: REG). More particularly, based on network conditions such as the number of NEs through which the optical signals pass, the span loss, and the span length; the network planning tool 350 obtains the NEs to which optical signals can be transmitted without using an REG. Then, in the NE 200-1 to the NE 200-n, the element management system 300 sets the reachable area information of the NE 200-1 to the NE 200-n, respectively, that was obtained by the network planning tool 350.

Figure 2:
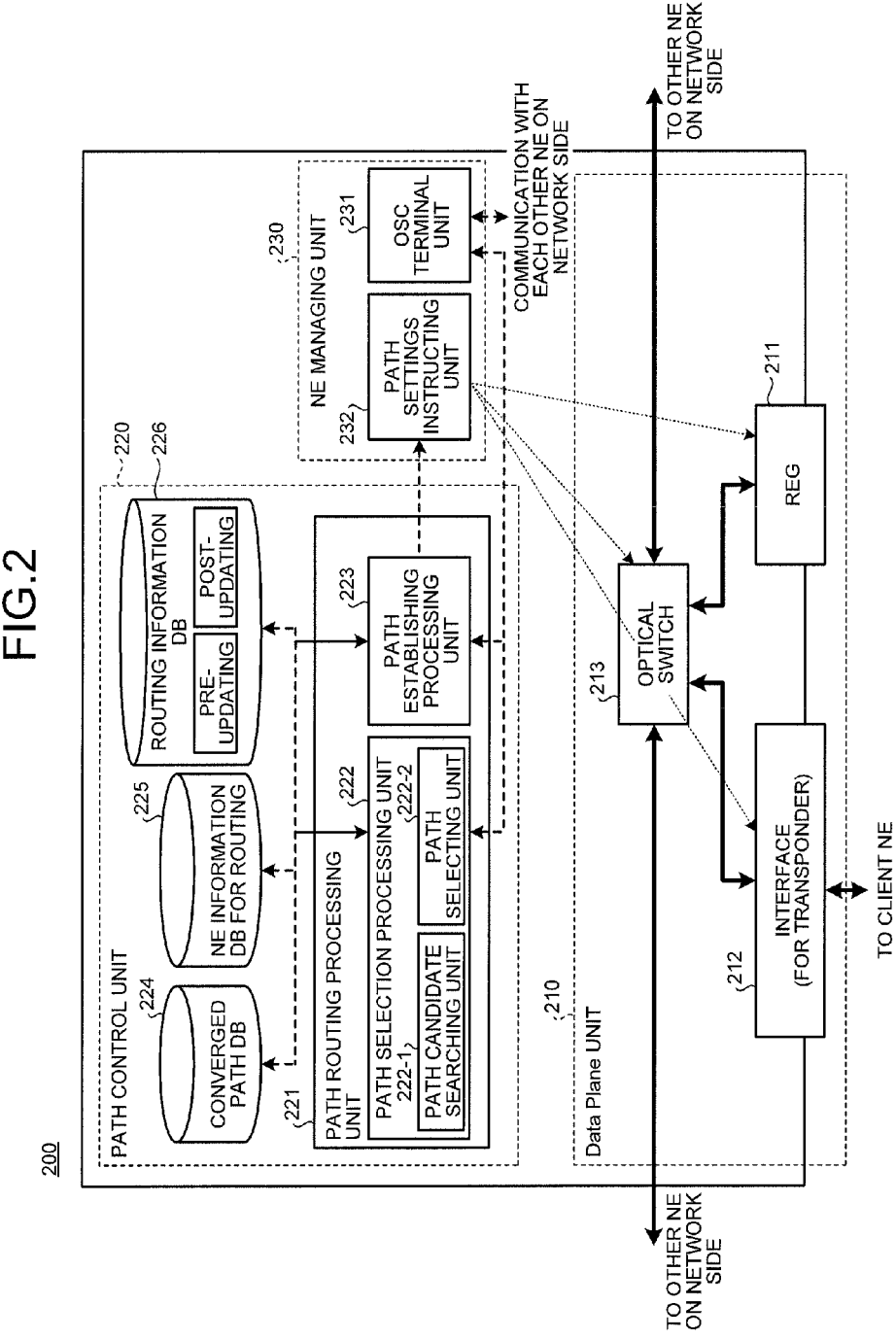
FIG. 2 is a diagram illustrating a functional configuration block of an NE.

FIG. 2 is a diagram illustrating a functional configuration block of each of the NE 200-1 to the NE 200-n. Herein, each of the NE 200-1 to the NE 200-n includes a Data Plane unit 210, a path control unit 220, and an NE managing unit 230. The Data Plane unit 210 has an interface for the wavelengths of DEMUXed (DE Multiplexed) optical signals. The Data Plane unit 210 includes an REG 211 functioning as an optical regenerator for performing optical signal regeneration in case of degradation in optical signal transmission and performing conversion of the wavelengths to be used. In addition, the Data Plane unit 210 also includes an interface 212 for various client-side NEs and an optical switch 213 that performs switching of optical signals.

The path control unit 220 includes a path routing processing unit 221 that performs path routing of optical signals of the NE 200-1 to the NE 200-n. The path routing processing unit 221 further includes a path selection processing unit 222 that selects transmission paths for optical signal transmission of the NE 200-1 to the NE 200-n; and includes a path establishing processing unit 223 that establishes transmission paths for optical signal transmission of the NE 200-1 to the NE 200-n. The path selection processing unit 222 further includes a path candidate searching unit 222-1 that searches for transmission path candidates for optical signal transmission of the NE 200-1 to the NE 200-n; and includes a path selecting unit 222-2 that selects a transmission path for optical signal transmission from among a plurality of transmission path candidates retrieved by the path candidate searching unit 222-1.

The path control unit 220 includes a converged path database (DB) 224, an NE information DB for routing 225, and a routing information DB 226. The converged path DB 224 is used to store, when optical signals are transmitted to other NEs other than the own NE, a list of path routes in which the optical signals converge without configuring a loop. The NE information DB for routing 225 is used to store information regarding various NEs that are used in routing. The routing information DB 226 is used to store data that is referred to and updated during path routing performed by the path routing processing unit 221. Meanwhile, in the routing information DB 226 of each of the NE 200-1 to the NE 200-n, the element management system 300 stores the reachable area information of the NE 200-1 to the NE 200-n, respectively, that was obtained by the network planning tool 350. The detailed explanation of the path selection processing unit 222 and the path establishing processing unit 223 is given later.

The NE managing unit 230 includes an OSC (Optical Supervisory Channel) terminal unit 231 and a path settings instructing unit 232. The OSC terminal unit 231 communicates data, which includes the reachable area information, with other NEs and obtains such data from other NEs; as well as extracts the reachable area information from the data obtained from other NEs and sends that reachable area information to the path routing processing unit 221. The path settings instructing unit 232 refers to path establishment settings information sent by the path establishing processing unit 223 and issues a settings request to the REG 211, the interface 212, and the optical switch 213.

Figure 3:
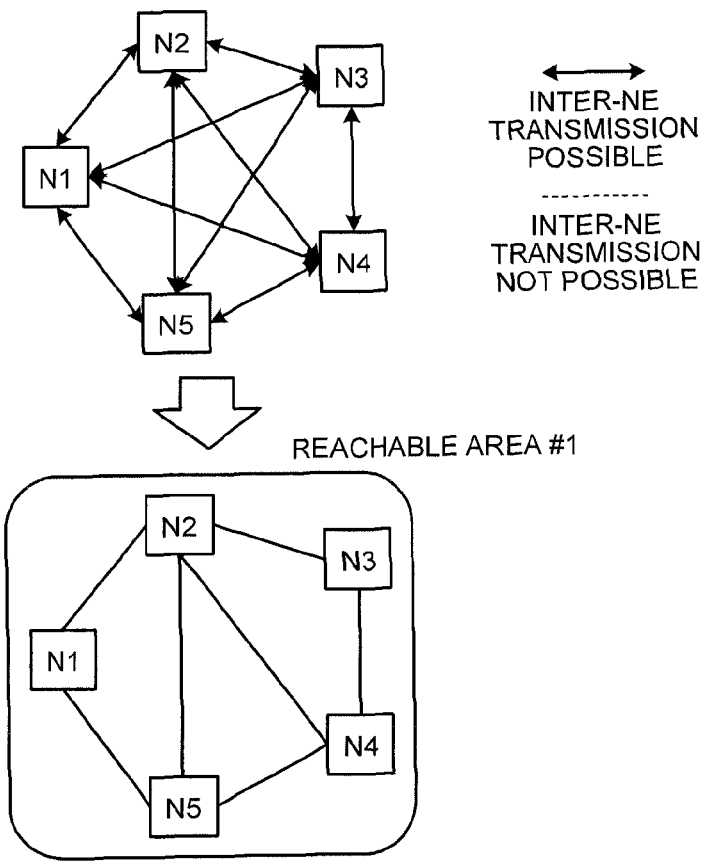
FIG. 3 is a diagram for explaining reachable area information.
Figure 4:
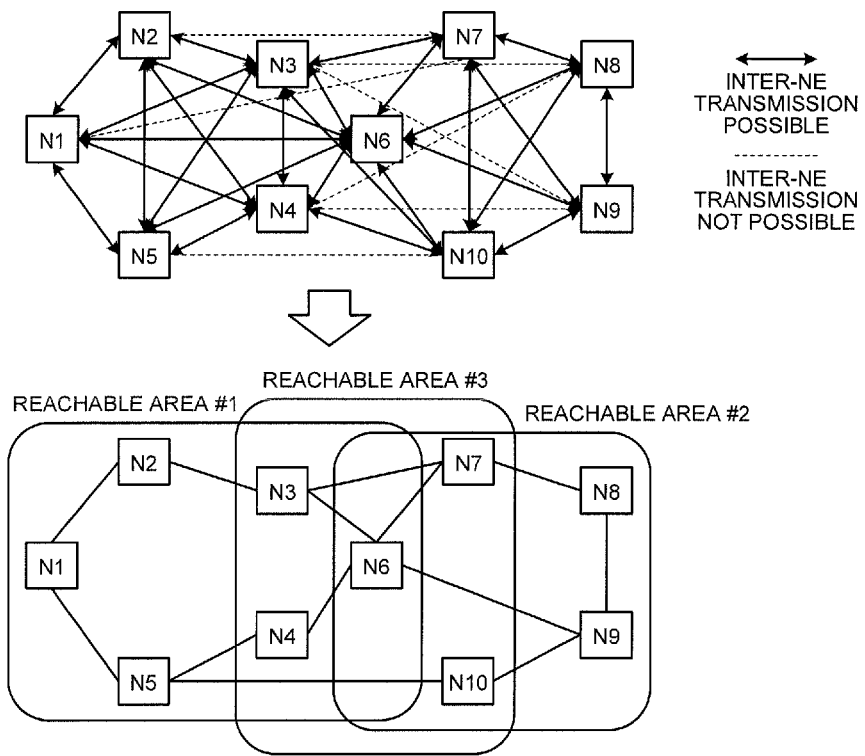
FIG. 4 is a diagram for explaining the reachable area information.

The following explanation is given regarding the reachable area information. FIG. 3 and FIG. 4 are diagrams for explaining the reachable area information. In FIG. 3 and FIG. 4, lines connecting two NEs indicate whether or not it is possible to perform transmission between those two NEs, and do not represent physical fibers. FIG. 3 illustrates an example in which the optical transport network system 100 includes five NEs and optical signals can be transmitted between any two NEs. In FIG. 3, the five NEs are referred to as N1 to N5. In this case, as illustrated in FIG. 3, each of N1 to N5 belongs to a reachable area #1. Thus, each of N1 to N5 has an area number #1. When a routing request is issued between two NEs, such as N1 and N4, that have identical attributes of the reachable area information; the optical transport network system 100 can determine that the REG 211 need not be used as long the transmission is performed through the NEs that have attributes of the same area.

In contrast, FIG. 4 illustrates an example in which the optical transport network system 100 includes 10 NEs, each belonging to a different reachable area. In FIG. 4, the 10 NEs are referred to as N1 to N10. FIG. 4 illustrates an example in which N1 to N6 belong to a reachable area #1; N6 to N10 belong to a reachable area #2; and N3, N4, N6, N7, and N10 belong to a reachable area #3. In this way, all NEs belong to one or more reachable areas. In this case, as illustrated in FIG. 4, N1 has an area number #1; N2 has an area number #1; N3 has area numbers #1 and #3; N4 has area numbers #1 and #3; and N5 has an area number #1. Moreover, N6 has area numbers #1, #2, and #3; N7 has area numbers #2 and #3; N8 has an area number #2; N9 has an area number #2; and N10 has area numbers #2 and #3.

Herein, consider a case when the transmission path for optical signal transmission includes NEs that do not have attributes of the same area as the own NE. That is, consider a case when a routing request is issued between NEs that have attributes of different areas. In that case, the optical transport network system 100 can determine that the REG 211 is to be used. For example, consider a case when a routing request is issued between N1 and N9 and when the path includes N1, N2, N3, N6, and N9 in that order. In that case, although N1, N2, N3, and N6 have the attributes of the area #1; N9 does not have the attributes of the area #1. Hence, the optical transport network system 100 determines that the REG 211 is to be used at N6.

Meanwhile, FIG. 4 illustrates an example in which, when a routing request cannot be covered by only a single reachable area, a plurality of reachable areas is defined in an overlapping manner. With that, it becomes possible to avoid the use of the REG 211, which need not be used under normal conditions. For example, in FIG. 4, the reachable area #3 is defined as an overlapping area. Herein, assume that the reachable area #3 is not defined, and only the reachable areas #1 and #2 are defined. Then, consider a case when a routing request issued between N3 and N7 takes a path that includes N3, N6, and N7 in that order. In that case, although N3 and N6 have the attributes of the reachable area #1, N7 does not have the attributes of the reachable area #1. Hence, it becomes supposed to make use of the REG 211 at N6. In contrast, when the reachable area #3 is defined in an overlapping manner; all of N3, N6, and N7 have the attributes of the same reachable area #3. Hence, the optical transport network system 100 can determine that there is no need to make use of the REG 211.

Given below is the explanation regarding the operations performed by the path selection processing unit 222 and the path establishing processing unit 223. Herein, instead of taking into account the network planning tool 350, the explanation is given for a configuration in which the NE 200-1 to the NE 200-n are equipped with a path searching function using reachable areas and are able to autonomously perform path routing in response to a routing request. Firstly, it is assumed that each of the NE 200-1 to the NE 200-n has a Colorless/Directionless function. That is, the NE 200-1 to the NE 200-n have a full optical cross connect function; and, once a path route is decided on, can freely connect optical paths without any constraints of routes/wavelengths. Moreover, while using the REG 211, the NE 200-1 to the NE 200-n can connect the REG 211, which is installed in advance, to the calculated routes/wavelengths. Besides, the NE 200-1 to the NE 200-n have a Topology Discovery function. That is, each of the NE 200-1 to the NE 200-n has a function of recognizing the NEs belonging to the same network as well as a function of searching for path routes in which optical signals converge without configuring a loop between NEs. Meanwhile, each of the NE 200-1 to the NE 200-n includes the OSC terminal unit 231 as an inter-NE communication unit for implementing the Topology Discovery function.

Moreover, under the assumption that the NE 200-1 to the NE 200-n perform path routing in an autonomous manner; the network planning tool 350 defines, as a reachable area, a set of NEs from among the NE 200-n that is capable of performing transmission without using the REG 211 from the NE 200-1. Herein, based on network conditions such as the number of NEs through which the optical signals pass, the span loss, and the span length; the network planning tool 350 decides on the NE that is capable of performing transmission without using the REG 211. With that, reachable area numbers for each of the NE 200-1 to the NE 200-n are decided.

Then, in the routing information DB 226 of each of the NE 200-1 to the NE 200-n, the network planning tool 350 stores the corresponding reachable area number as an attribute.

When a routing request is issued, the NE 200-1 to the NE 200-n refer to the respective reachable area numbers and other information stored in the respective routing information DBs 226, and accordingly perform wavelength routing and allocate the REG 211. FIG. 5 is a diagram for explaining the data 400 that is held by each of the NE 200-1 to the NE 200-n for the purpose of autonomous routing. To start with, the data 400 held by each of the NE 200-1 to the NE 200-n contains NE number 400-1 of the own NE. More particularly, the NE 200-1 to the NE 200-n have an NE number 1 to an NE number n that represent NE serial numbers. Moreover, the data 400 held by each of the NE 200-1 to the NE 200-n contains reachable area number 400-2 to which the corresponding NE belongs. More particularly, each of the NE 200-1 to the NE 200-n has a reachable area number from among a reachable area number 1 to a reachable area number a (where, "a" is a positive integer equal to or greater than two).

Furthermore, the data 400 held by each of the NE 200-1 to the NE 200-n contains unused wavelength number 400-3 for each fiber route. More particularly, with respect to each of a fiber route 1 to a fiber route d (where "d" is a positive integer equal to or greater than two), each of the NE 200-1 to the NE 200-n has a unused wavelength from among a ch (channel) 1 to a ch (channel) c (where "c" is a positive integer equal to or greater than two). On the other hand, when there is no unused wavelength available, the NE 200-1 to the NE 200-n have NA (Not Available) with respect to each of the fiber route 1 to the fiber route d. Moreover, the data 400 held by each of the NE 200-1 to the NE 200-n contains a destination NE number for each fiber route and contains reachable area number 400-4 to which the destination NE belongs. More particularly, with respect to each of the fiber route 1 to the fiber route d; each of the NE 200-1 to the NE 200-n has a destination NE number and a reachable area number to which the destination NE belongs. Furthermore, the data 400 held by each of the NE 200-1 to the NE 200-n contains path pattern information 400-5 that indicates paths in which optical signals converge without configuring a loop between NEs in a network. More particularly, with respect to each combination of an NE serving as the source of transmitting optical signals and an NE serving as the destination for the optical signals that have been transmitted, each of the NE 200-1 to the NE 200-n has a plurality of path numbers from a path 1 to a path r (where "r" is a positive integer equal to or greater than two). Furthermore, with respect to each of the path 1 to the path r, the NE 200-1 to the NE 200-n have NE numbers of all NEs through which optical signals are transmitted.

When a routing request is issued, the NE 200-1 to the NE 200-n mainly perform path searching operations and path establishing operations. In order to be able to autonomously perform path searching operations and path establishing operations with the use of the path selection processing unit 222 and the path establishing processing unit 223; the NE 200-1 to the NE 200-n communicate data including the reachable area information with each other. More particularly, data including the reachable area information is sequentially transferred from the NE serving as the source of transmitting wavelength-multiplexed optical signals to the NE serving as the destination for the wavelength-multiplexed optical signals that have been transmitted. In the following explanation, the data that is communicated among the NE 200-1 to the NE 200-*n* is referred to as "routing information table 500". Moreover, in the following explanation, the NE serving as the source of transmitting wavelength-multiplexed optical signals is referred to as "FROM NE" and the NE serving as the destination for the wavelength-multiplexed optical signals that have been transmitted is referred to as "TO NE".

FIG. 6 is a diagram illustrating a configuration of the routing information table. Herein, the routing information table 500 contains path pattern information 500-1 regarding target path patterns for routing requests. The path pattern information 500-1 is generated in the FROM NE; and contains FROM NE information, TO NE information, and a path number. Moreover, the routing information table 500 contains reachable area number 500-2 that is allocated at that point in time. The reachable area number 500-2 gets continually updated while the routing information table 500 is transferred from the FROM NE to the TO NE via intermediate NEs.

Furthermore, the routing information table 500 contains usable wavelengths 500-3 indicating the usable wavelengths at that point in time. The usable wavelengths 500-3 points to unused wavelength information in the route toward the downstream NE in the direction of optical signal transmission. Moreover, the routing information table 500 contains allocated REG count through the path 500-4 that points to the number of times for which the optical signals pass through REGs while being transmitted from the FROM NE to the TO NE. In addition, the allocated REG count through the path 500-4 also indicates the number of times for which the reachable area number is changed while the routing information table 500 is transferred from the FROM NE to the TO NE via intermediate NEs. Moreover, the routing information table 500 contains wavelength conversion REG count 500-5 that indicates the number of times for which wavelength conversion is performed while the routing information table 500 is transferred from the FROM NE to the TO NE via intermediate NEs. Furthermore, the routing information table 500 contains non-transmittable condition flag 500-6, which is a flag indicating that a path cannot be established to transmit optical signals because of the lack of a unused wavelength. Meanwhile, the path selection processing unit 222 refers to the information from the path pattern information 500-1 through the non-transmittable condition flag 500-6 in performing a path searching operation.

Moreover, the routing information table 500 contains used wavelength 500-7 that indicates the wavelengths that are actually established. Furthermore, the routing information table 500 contains area conversion REG flag 500-8, which is a flag used in instructing that the REG 211 needs to be inserted while establishing a path. Meanwhile, the path establishing processing unit 223 refers to the used wavelength 500-7 and the area conversion REG flag 500-8 while performing a path establishing operation.

Explained below is a sequence of operations during a path searching operation performed mainly by the path selection processing unit 222. FIG. 7 is a flowchart for explaining sequences of operations performed during a path searching operation in the optical transport network system 100 according to the present embodiment. In FIG. 7 is illustrated a sequence of operations performed in the FROM NE, a sequence of operations performed in an intermediate NE, and a sequence of operations performed in the TO NE.

Firstly, when the FROM NE and the TO NE are specified while issuing a routing request, the FROM NE uses the path candidate searching unit 222-1 to refer to the converged path DB 224 and to search for path patterns in which optical signals converge without configuring a loop (Step S101).

These path patterns serve as a plurality of path candidates for optical signal transmission. Then, regarding all of the path patterns that have been retrieved, the FROM NE creates routing information tables with the same demand ID assigned thereto, and sends the routing information tables to the adjacent NEs corresponding to the path candidates (Step S102).

FIG. 8 is a diagram illustrating a configuration of a routing information table created by the FROM NE. In the path pattern information 500-1 is stored FROM NE information, TO NE information, and a path number. In the reachable area number 500-2 is stored the reachable area number to which the FROM NE belongs. In the usable wavelengths 500-3 are stored the unused wavelengths in the route to the adjacent NE. In the allocated REG count through the path 500-4 is stored "0" as the initial value. In the wavelength conversion REG count 500-5 is stored "0" as the initial value. In the non-transmittable condition flag 500-6; "0" is stored when a unused wavelength is available on the route to the adjacent NE and "1" is stored if no unused wavelength is available on the route to the adjacent NE. The used wavelength 500-7 and the area conversion REG flag 500-8 remain unused, and no specific information is stored therein at this point in time.

Returning to the explanation with reference to FIG. 7, based on the routing information table 500 that has been received, an intermediate NE confirms whether optical signals travel across two or more reachable areas (Step S103). More particularly, an intermediate NE confirms whether or not the identifier thereof is included in the identifiers of NEs belonging to the reachable area number 500-2. If the identifier of that intermediate NE is not included in the identifiers of NEs belonging to the reachable area number 500-2, the intermediate NE determines that the optical signals travel across two or more reachable areas (Yes at Step S103). When it is determined that the optical signals travel across two or more reachable areas, the intermediate NE updates the reachable area number 500-2 in the routing information table 500 that has been received. More particularly, the intermediate NE updates the reachable area number 500-2 in the routing information table 500 that has been received to the reachable area number 500-2 stored in the routing information DB 226 of the NE that sent the reachable area number 500-2. Moreover, when it is determined that the optical signals travel across two or more reachable areas, the intermediate NE increments the allocated REG count through the path 500-4 in the routing information table 500 that has been received (Step S104).

Then, based on the routing information table 500 that has been received, the intermediate NE confirms whether or not there is a change in the wavelength of the optical signals (Step S105). More particularly, when the usable wavelengths 500-3 in the routing information table 500 that has been received does not overlap with the unused wavelength information in the route toward the downstream NE of the intermediate NE, then the intermediate NE determines to change the wavelength of the optical signals (Yes at Step S105). In that case, the intermediate NE increments the wavelength conversion REG count 500-5 in the routing information table 500 that has been received (Step S106). Meanwhile, if the intermediate NE happens to increment the allocated REG count through the path 500-4 at Step S104 as well as increment the wavelength conversion REG count 500-5 at Step S106, then one of the two counts is sometimes not incremented.

FIG. 9 is a diagram for concretely explaining the operations performed by an intermediate NE at Step S105 and Step S106. As illustrated in FIG. 9, an intermediate NE confirms whether or not the usable wavelengths 500-3 in the routing information table 500 that has been received are specified in the unused wavelength information in the route toward the downstream NE of the intermediate NE (Step S201). If the usable wavelengths 500-3 are specified in the unused wavelength information in the route toward the downstream NE of the intermediate NE (Yes at Step S201), then the intermediate NE holds the usable wavelengths 500-3 and the wavelength conversion REG count 500-5 without modifying them (Step S202). On the other hand, if the usable wavelengths 500-3 are not specified in the unused wavelength information in the route toward the downstream NE of the intermediate NE (No at Step S201), then the intermediate NE confirms whether or not there are overlapping wavelengths in the usable wavelengths 500-3 and the unused wavelength information (Step S203). If there are overlapping wavelengths (Yes at Step S203), then the intermediate NE updates the usable wavelengths 500-3 to all overlapping unused wavelength information (Step S204).

On the other hand, if there are no overlapping wavelengths (No at Step S203); then the intermediate NE confirms whether or not unused wavelength information in the route toward the downstream NE of the intermediate NE is present (Step S205). When such unused wavelength information is present (Yes at Step S205), the intermediate NE updates the usable wavelengths 500-3 in the routing information table 500 that has been received to all unused wavelength information in the route toward the downstream NE of the intermediate NE (Step S206). Moreover, the intermediate NE increments the wavelength conversion REG count 500-5 in the routing information table 500 that has been received (Step S206). On the other hand, when the unused wavelength information is not present (No at Step S205), the intermediate NE sets "1" in the non-transmittable condition flag 500-6 in the routing information table 500 that has been received (Step S207).

Returning to the explanation with reference to FIG. 7, the intermediate NE confirms whether or not it itself is the TO NE (Step S107). More particularly, the intermediate NE determines whether or not the TO NE information specified in the path pattern information 500-1 sent by the FROM NE matches with the NE information of the intermediate NE, and accordingly confirms whether or not it itself is the TO NE. If the intermediate NE determines that it is not the TO NE (No at Step S107), then the intermediate NE sends the routing information table 500 to the adjacent NE (Step S108). Herein, if the intermediate NE has updated the routing information table 500, then it holds the pre-updating routing information table 500 as well as the post-updating routing information table 500, and sends both those tables to the adjacent NE. Each such adjacent NE that receives the routing information table 500 repeats the operations from Step S103 to Step S108 until it itself is determined to be the TO NE at Step S107.

Meanwhile, if an intermediate NE determines that it itself is the TO NE (Yes at Step S107), then the intermediate NE confirms whether or not the routing information table 500 is received from each path pattern (Step S109). When it is determined that the routing information table 500 is received from each path pattern (Yes at Step S109), the TO NE selects a path pattern for optical signal transmission based on the routing information table 500 received from each path pattern (Step S110). More particularly, the TO NE compares the sum of the allocated REG count through the path 500-4 and the wavelength conversion REG count 500-5 in the routing information table 500 received from each path pattern, and selects the path pattern having the smallest sum. However, from that selection, the TO NE excludes the path patterns for which "1" is set in the non-transmittable condition flag 500-6.

Figure 10:
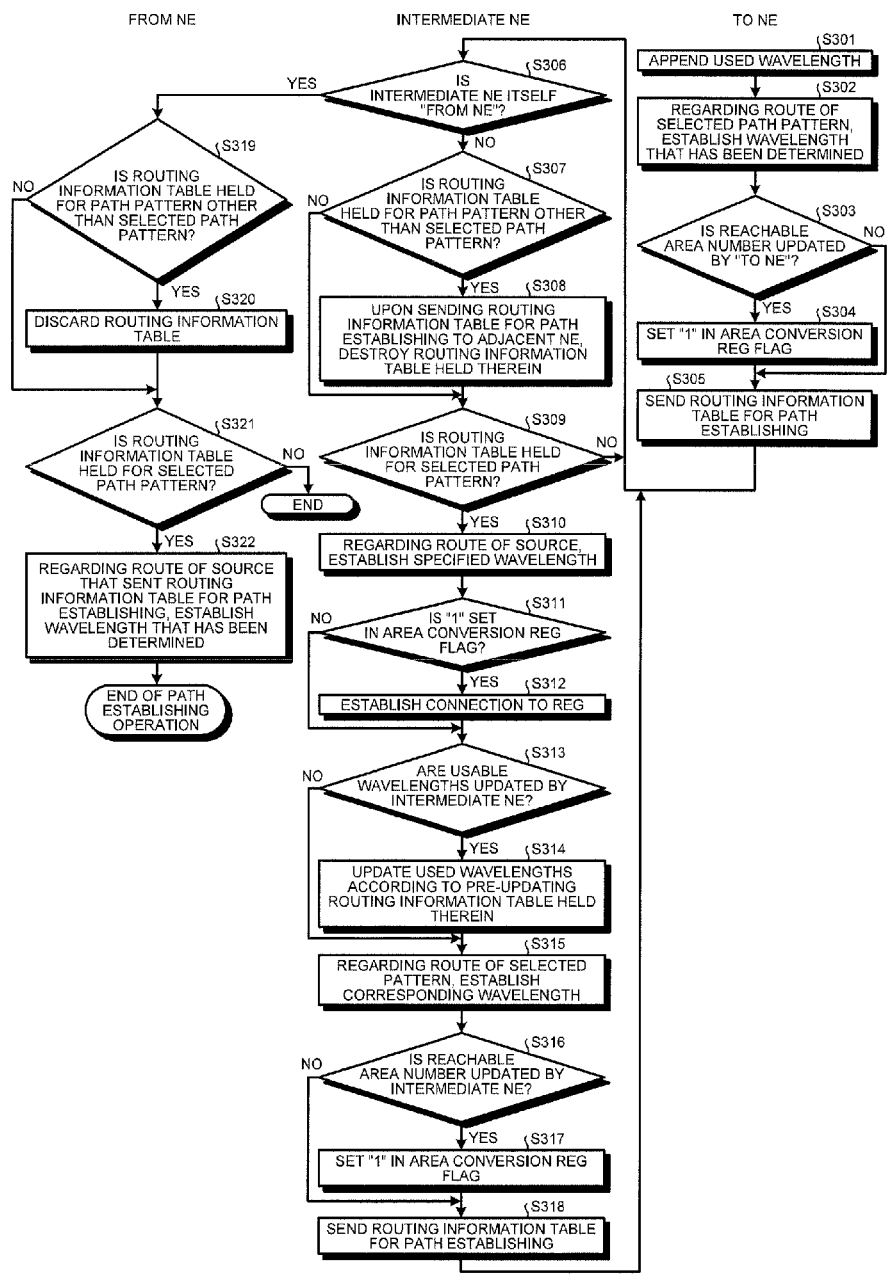
FIG. 10 is a flowchart for explaining sequences of operations performed during a path establishing operation in the optical transport network system according to the present embodiment.

Explained below is a sequence of operations during a path establishing operation performed mainly by the path establishing processing unit 223. FIG. 10 is a flowchart for explaining sequences of operations performed during a path establishing operation in the optical transport network system 100 according to the present embodiment. In FIG. 10 is illustrated a sequence of operations performed in the FROM NE, a sequence of operations performed in an intermediate NE, and a sequence of operations performed in the TO NE.

Firstly, based on the usable wavelengths 500-3 in the routing information table 500 corresponding to the selected path pattern, the TO NE appends the used wavelength 500-7 (Step S301). Then, with respect to the route of the selected path pattern, the TO NE establishes the wavelength determined at Step S301 (Step S302). Subsequently, the TO NE confirms whether or not it itself has updated the reachable area number 500-2 in the routing information table 500 of the selected path pattern (Step S303). If it is determined that the TO NE has updated the reachable area number 500-2 (Yes at Step S303), then the TO NE sets "1" in the area conversion REG flag 500-8 (Step S304). Then, to the adjacent NE of each path pattern in which optical signals converge without configuring a loop between NEs, the TO NE sends a routing information table for path establishing (Step S305). The routing information table for path establishing contains the used wavelength 500-7 and the area conversion REG flag 500-8 specified in the routing information table 500.

Upon receiving the routing information table for path establishing, an intermediate NE refers to the path pattern information 500-1 and confirms whether or not it itself is the FROM NE (Step S306). If the intermediate NE is not the FROM NE (No at Step S306), then the intermediate NE confirms whether or not the routing information table 500 having the same demand ID is held for a path pattern other than the selected path pattern (Step S307). If it is determined that the routing information table 500 having the same demand ID is held for a path pattern other than the selected path pattern (Yes at Step S307), the intermediate NE sends the routing information table for path establishing to the adjacent NE on the upstream side in the direction of optical signal transmission (Step S308). Moreover, the intermediate NE discards the routing information table 500 that was held for a path pattern other than the selected path pattern (Step S308).

Then, the intermediate NE confirms whether or not it holds the routing information table 500 of the selected path pattern (Step S309). If the intermediate NE does not hold the routing information table 500 (No at Step S309), then the process is transferred to the adjacent NE on the upstream side in the direction of optical signal transmission, and the process returns to Step S306. On the other hand, if the intermediate NE is holding the routing information table 500 (Yes at Step S309), then the intermediate NE establishes the wavelengths specified in the used wavelength 500-7 included in routing information table for path establishing (Step S310). More particularly, regarding the route of the source from which the intermediate NE received the routing information table for path establishing, the intermediate NE establishes the wavelength specified in the used wavelength 500-7 included in routing information table for path establishing. Then, the intermediate NE confirms whether or not "1" is set in the area conversion REG flag 500-8 (Step S311). If "1" is set in the area conversion REG flag 500-8 (Yes at Step S311), then the intermediate NE establishes a connection to the REG 211 thereof and sets "0" in the area conversion REG flag 500-8 (Step S312).

Subsequently, the intermediate NE confirms whether or not it itself has updated the usable wavelengths 500-3 in the routing information table 500 of the selected path pattern (Step S313). If it is determined that the intermediate NE has updated the usable wavelengths 500-3 (Yes at Step S313), then the intermediate NE establishes a connection to the REG 211 thereof and updates the used wavelength 500-7 to the usable wavelengths specified in the pre-updating routing information table held therein (Step S314). Then, regarding the route of the selected pattern, the intermediate NE establishes the corresponding wavelength (Step S315).

Subsequently, the intermediate NE confirms whether or not it itself has updated the reachable area number 500-2 in the routing information table 500 of the selected path pattern (Step S316). If it is determined that the intermediate NE has updated the reachable area number 500-2 (Yes at Step S316), then the intermediate NE sets "1" in the area conversion REG flag 500-8 (Step S317). Then, to the adjacent NE on the upstream side in the path specified in the routing information table for path establishing, the intermediate NE sends the routing information table for path establishing (Step S318). Each such adjacent NE that receives the routing information table for path establishing repeats the operations from Step S306 to Step S318 until it itself is determined to be the FROM NE at Step S306.

Meanwhile, if it is determined that an intermediate NE itself is the FROM NE (Yes at Step S306), then the FROM NE confirms whether or not it holds the routing information table 500 having the same demand ID for a path pattern other than the selected path pattern (Step S319). If the FROM NE is holding such a routing information table 500 (Yes at Step S319), then the FROM NE discards that routing information table 500 (Step S320). Then, the FROM NE confirms whether or not it holds the routing information table 500 of the selected path pattern (Step S321). If the FROM NE does not hold the routing information table 500 (No at Step S321), then the operations are terminated. On the other hand, if the FROM NE is holding the routing information table 500 (Yes at Step S321), then the FROM NE establishes the specified wavelength for the route of the source that sent the routing information table for path establishing (Step S322). That marks the end of the path establishing operation.

Figure 11:
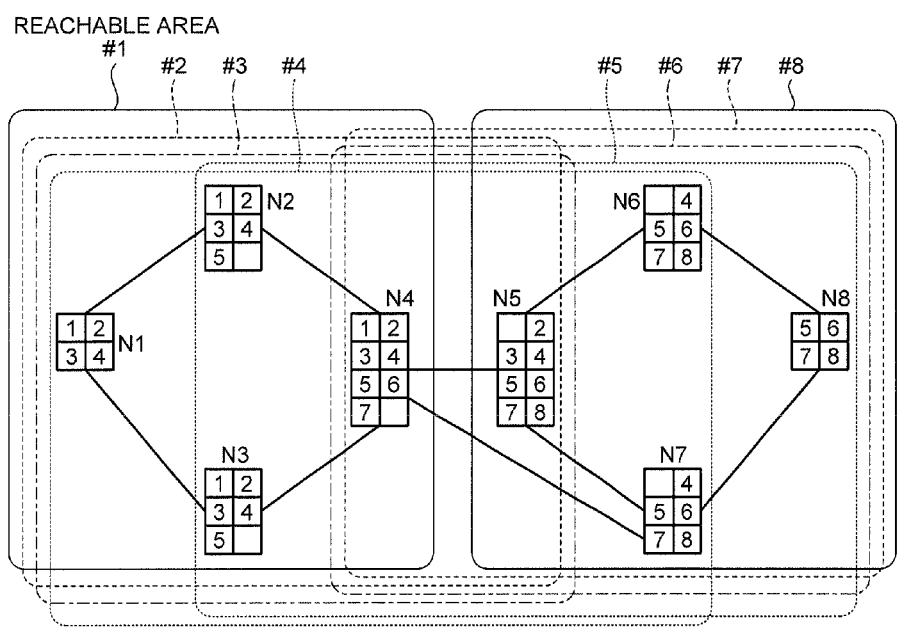
FIG. 11 is a diagram illustrating an example of reachable areas in the optical transport network system.
Figure 15:
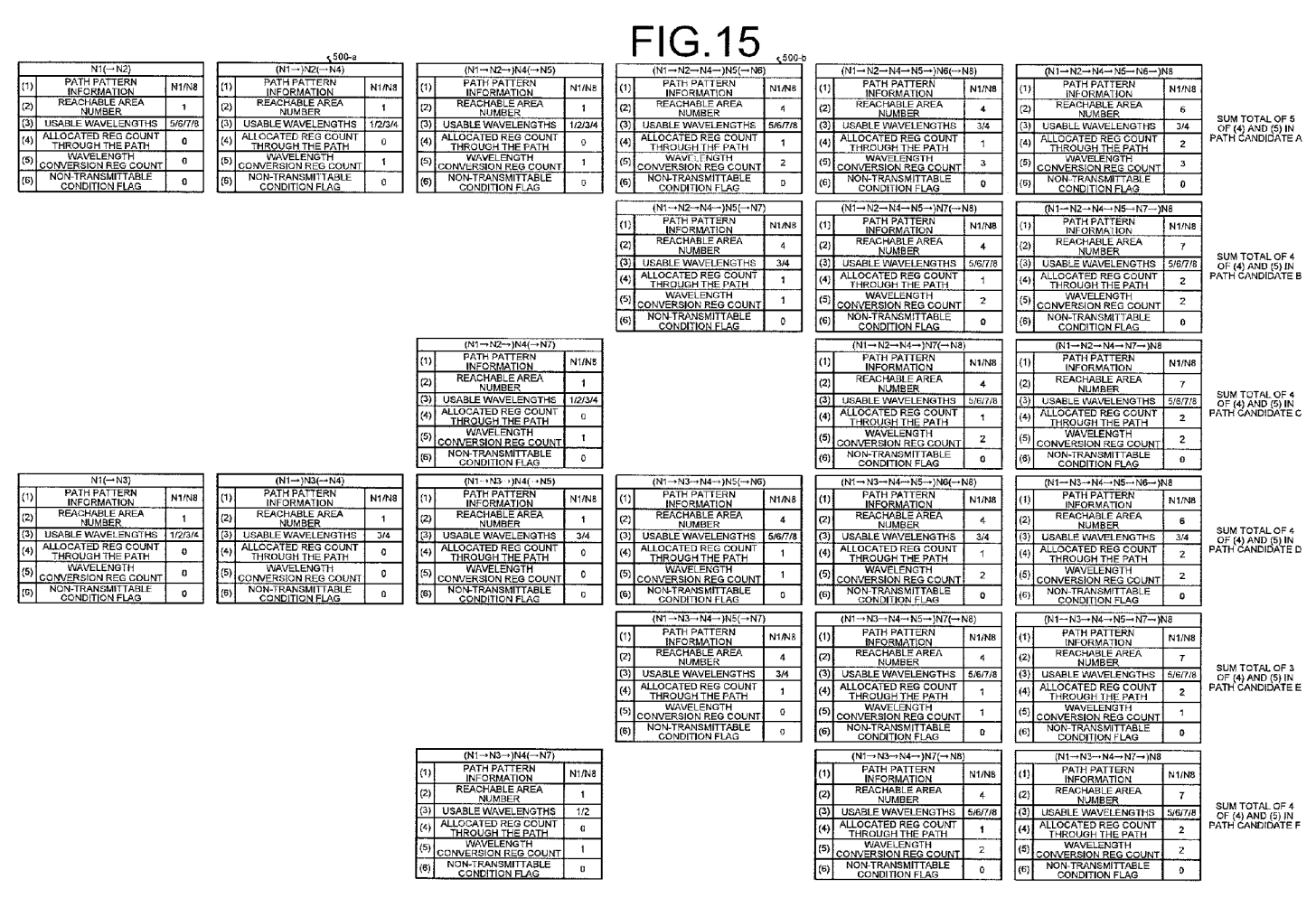

Explained below is an example of more concrete operations performed in the optical transport network system 100 in response to a routing request. FIG. 11 is a diagram illustrating an example of reachable areas for a plurality of NEs in the optical transport network system. FIG. 12 is a diagram illustrating an exemplary table regarding the reachable area numbers in the optical transport network system. FIG. 13 is a diagram illustrating a table regarding the NE identifiers in the optical transport network system. FIG. 14 is a diagram illustrating an exemplary unused wavelength status of optical signals from the FROM NE to the TO NE. FIG. 15 is a diagram illustrating exemplary transition states of the routing information table 500 in the optical transport network system. Meanwhile, in the optical transport network system 100 according to the present embodiment, the accuracy of the network design, that is, the possibility of exclusion of the REG 211 changes depending on the definition of reachable areas and the manner of overlapping. In the following example, the explanation is given for exemplary reachable areas that enable exclusion of the REG 211, which is used in optical signal transmission, to the maximum extent possible.

In the example illustrated in FIG. 11, the optical transport network system 100 includes eight NEs. In FIG. 11, the eight NEs are referred to as N1 to N8. Firstly, in the optical transport network system 100 under consideration, with respect to each of N1 to N8, the element management system 300 determines an NE that is capable of transmitting optical signals without using the REG 211. Then, with respect to each of N1 to N8, the element management system 300 defines, as a reachable area, the NE that is capable of transmitting optical signals without using the REG 211. Thus, the element management system 300 defines reachable areas that are equal in number to the number of NEs present in the optical transport network system 100. Herein, as illustrated in FIG. 11, it is assumed that the element management system 300 defines reachable areas #1 to #8.

In that case, as illustrated in FIG. 12, the reachable area number 1 is defined as the set of NEs, starting from N1, that are capable of performing transmission without using the REG 211. The NEs belonging to that area are N1 to N4. Similarly, the reachable area number 2 is defined as the set of NEs, starting from N2, that are capable of performing transmission without using the REG 211. The NEs belonging to that area are N1 to N5. Moreover, the reachable area number 3 is defined as the set of NEs, starting from N3, that are capable of performing transmission without using the REG 211. The NEs belonging to that area are N1 to N5. Furthermore, the reachable area number 4 is defined as the set of NEs, starting from N4, that are capable of performing transmission without using the REG 211. The NEs belonging to that area are N1 to N7. Moreover, the reachable area number 5 is defined as the set of NEs, starting from N5, that are capable of performing transmission without using the REG 211. The NEs belonging to that area are N2 to N8. Furthermore, the reachable area number 6 is defined as the set of NEs, starting from N6, that are capable of performing transmission without using the REG 211. The NEs belonging to that area are N4 to N8. Moreover, the reachable area number 7 is defined as the set of NEs, starting from N7, that are capable of performing transmission without using the REG 211. The NEs belonging to that area are N4 to N8. Finally, the reachable area number 8 is defined as the set of NEs, starting from N8, that are capable of performing transmission without using the REG 211. The NEs belonging to that area are N5 to N8.

In other words, as illustrated in FIG. 13, N1 belongs to the reachable areas having reachable area numbers 1 to 4. Similarly, N2 belongs to the reachable areas having reachable area numbers 1 to 5. Moreover, N3 belongs to the reachable areas having reachable area numbers 1 to 5. Furthermore, N4 belongs to the reachable areas having reachable area numbers 1 to 7. Moreover, N5 belongs to the reachable areas having reachable area numbers 2 to 8. Furthermore, N6 belongs to the reachable areas having reachable area numbers 4 to 8. Moreover, N7 belongs to the reachable areas having reachable area numbers 4 to 8. Furthermore, N8 belongs to the reachable areas having reachable area numbers 5 to 8.

Meanwhile, in this example, as illustrated in FIG. 14, when N1 serves as the FROM NE and N2 serves as the TO NE; it is assumed that ch1 to ch4 are used wavelengths but ch5 to ch8 are unused wavelengths. Similarly, when N2 serves as the FROM NE and N4 serves as the TO NE; it is assumed that ch5 to ch8 are used wavelengths but ch1 to ch4 are unused wavelengths. Moreover, when N4 serves as the FROM NE and N3 serves as the TO NE; it is assumed that ch1, ch2, ch5, and ch6 are used wavelengths but ch3, ch4, ch7, and ch8 are unused wavelengths. Furthermore, when N3 serves as the FROM NE and N1 serves as the TO NE; it is assumed that ch5 to ch8 are used wavelengths but ch1 to ch4 are unused wavelengths. Moreover, when N4 serves as the FROM NE and N7 serves as the TO NE; it is assumed that ch3 to ch8 are used wavelengths but ch1 and ch2 are unused wavelengths. Furthermore, when N4 serves as the FROM NE and N5 serves as the TO NE; it is assumed that ch5 to ch8 are used wavelengths but ch1 to ch4 are unused wavelengths. Moreover, when N5 serves as the FROM NE and N6 serves as the TO NE; it is assumed that ch1 to ch4 are used wavelengths but ch5 to ch8 are unused wavelengths. Furthermore, when N6 serves as the FROM NE and N8 serves as the TO NE; it is assumed that ch1, ch2, and ch5 to ch8 are used wavelengths but ch3 and ch4 are unused wavelengths. Moreover, when N8 serves as the FROM NE and N7 serves as the TO NE; it is assumed that ch1 to ch4 are used wavelengths but ch5 to ch8 are unused wavelengths. Furthermore, when N7 serves as the FROM NE and N5 serves as the TO NE; it is assumed that ch1, ch2, ch5, and ch6 are used wavelengths but ch3, ch4, ch7, and ch8 are unused wavelengths.

In such a case, the routing information table 500 in the optical transport network system undergoes transitions in the manner illustrated in FIG. 15. Herein, FIG. 15 illustrates exemplary transitions of the routing information table 500 when N1 serves as the FROM NE and N8 serves as the TO NE. The following explanation is given with the focus on the places at which the routing information table 500 gets updated while being sequentially transferred from N1 to N8 via the intermediate NEs.

Firstly, consider a case when optical signals are transmitted via a path candidate A in which N1, N2, N4, N5, N6, and N8 are positioned in that order. The unused wavelengths in the route from N1 toward N2 are ch5 to ch8, and the unused wavelengths in the route from N2 toward N4 are ch1 to ch4. Thus, there is no overlapping of unused wavelengths in those two routes. Hence, in a routing information table 500-*a*; N2 updates the usable wavelengths to 1/2/3/4. Moreover, in the routing information table 500-*a*; N2 increments the wavelength conversion REG count and updates it to "1".

The unused wavelengths in the route from N4 toward N5 are ch1 to ch4, and the unused wavelengths in the route from N5 toward N6 are ch5 to ch8. Thus, there is no overlapping of unused wavelengths in those two routes. Hence, in a routing information table 500-*b*; N5 updates the usable wavelengths to 5/6/7/8. Moreover, in the routing information table 500-*b*; N5 increments the wavelength conversion REG count and updates it to "2". Furthermore, since N5 is not specified as one of the NEs belonging to the reachable area number "1" in the routing information table 500 sent by N4; N5 updates the reachable area number to "4" in the routing information table 500-*b*. That is, N5 updates the reachable area number in the routing information table 500-*b* to the reachable area number of N4 that sent the routing information table 500. Moreover, in the routing information table 500-*b*; N5 increments the allocated REG count through the path and updates it to "1". Subsequently, in N6 and N8 too, the routing information table 500 is updated in an identical manner to that updated by N2 and N5.

Meanwhile, regarding a path candidate B in which N1, N2, N4, N5, N7, and N8 are positioned in that order as well as regarding a path candidate C in which N1, N2, N4, N7, and N8 are positioned in that order; the routing information table 500 is sequentially sent from the FROM NE toward the TO NE and is updated in an identical manner to the description given above. Similarly, regarding a path candidate D in which N1, N3, N4, N5, N6, and N8 are positioned in that order as well as regarding a path candidate E in which N1, N3, N4, N5, N7, and N8 are positioned in that order; the routing information table 500 is sequentially sent from the FROM NE toward the TO NE and is updated in an identical manner to the description given above. Moreover, regarding a path candidate F in which N1, N3, N4, N7, and N8 are positioned in that order; the routing information table 500 is sequentially sent from the FROM NE toward the TO NE and is updated in an identical manner to the description given above. Regarding each of the path candidate A to the path candidate F; N8 obtains a sum total by adding the allocated REG count through the path and the wavelength conversion REG count specified in the routing information table 500 that is received. Then, as the path for optical signal transmission, N8 selects the path candidate E having the smallest sum total.

In this way, in the optical transport network system according to the present embodiment, reachable area information is defined for each of a plurality of NEs that constitutes the optical transport network system. As a result, when a routing request is issued, the plurality of NEs become capable of autonomously selecting the transmission paths for optical signal transmission. Thus, in the optical transport network system according to the present embodiment, by making use of the reachable area information of each NE, it becomes possible to easily perform reachability calculation and path selection without performing detailed optical parameter calculation in response to each routing request. As a result, in the optical transport network system according to the present embodiment, there is a decrease in the processing load for performing reachability calculation and path selection. Hence, reachability calculation and path selection need not be performed with the use of an Off-Line tool, but can be performed in an autonomous manner by a plurality of NEs.

Moreover, in the optical transport network system according to the present embodiment; the selection of transmission paths for optical signal transmission is performed by referring not only to the reachable area information of each NE but also to the unused wavelength information in the routes for optical signals. That makes it possible to select a transmission path in a more appropriate manner. Thus, by taking into account the unused wavelength information in the routes for optical signals, it becomes possible to select a path in which the REG 211 is used for the least number of times for the purpose of wavelength conversion of optical signals.

According to an aspect of the optical transport network system disclosed in the application concerned, an optical transmission device becomes capable of autonomously selecting a transmission path for optical signal transmission.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transport network system comprising a plurality of optical transmission devices each transmitting optical signals that are wavelength-multiplexed, wherein
an optical transmission device from among the plurality of optical transmission devices includes a memory unit that is used to store reachable area information, which contains identifiers of other optical transmission devices present in a range within which the optical signals can be transmitted from the optical transmission device without using a regenerator,
a source optical transmission device that is specified from among the plurality of optical transmission devices as a source of transmitting the optical signals includes a path candidate searching unit that searches for a plurality of path candidates for transmitting the optical signals from the source optical transmission device to a destination optical transmission device that is specified from among the plurality of optical transmission devices as a destination of the transmitted optical signals, each of the source optical transmission device, an intermediate optical transmission device that relays the transmitted optical signals on a path candidate from among the plurality of path candidates, and the destination optical transmission device includes a transmitting-receiving unit that sequentially transmits and receives the reachable area information from the source optical transmission device to the destination optical transmission device via each of the plurality of path candidates, the source optical transmission device transmitting the reachable area information that is stored in the memory unit thereof to the intermediate optical transmission device that is adjacent to the source optical transmission device, an optical transmission device from among the intermediate optical transmission device and the destination optical transmission device includes an updating unit that, when the received reachable area information does not contain an identifier of the optical transmission device, updates the received reachable area information to the reachable area information that is stored in the memory unit of another optical transmission device that is adjacent to the optical transmission device and sent the received reachable area information to the optical transmission device, and the destination optical transmission device includes a path selecting unit that obtains a number of times for which the regenerator is used for each of the plurality of path candidates based on the respective number of times for which the reachable area information is updated by the updating unit, and, based on each number of times that is obtained, selects a path for transmitting the optical signals from among the plurality of path candidates.

2. The optical transport network system according to claim 1, wherein from the source optical transmission device to the destination optical transmission device, the transmitting-receiving unit sequentially transmits and receives the reachable area information as well as unused wavelength information in a route toward a downstream optical transmission device in a transmission direction of the optical signals, when the unused wavelength information received by the transmitting-receiving unit does not overlap with unused wavelength information in a route toward the downstream optical transmission device of the optical transmission device, the updating unit updates the unused wavelength information received by the transmitting-receiving unit to the unused wavelength information of the optical transmission device, and based on the number of times for which the reachable area information is updated and based on a number of times for which the unused wavelength information is updated, the path selecting unit selects a path for transmitting the optical signals from among the plurality of path candidates.

3. The optical transport network system according to claim 1, further comprising an element manager that obtains the reachable area information of the plurality of optical transmission devices and stores the obtained reachable area information in the respective memory units of the plurality of optical transmission devices.

4. An optical-signal transmission path selecting method comprising:

storing, in a memory unit of an optical transmission device from among a plurality of optical transmission devices each transmitting optical signals that are wavelength-multiplexed, reachable area information that contains identifiers of other optical transmission devices present in a range within which the optical signals can be transmitted from the optical transmission device without using a regenerator;

searching, when a source optical transmission device is specified from among the plurality of optical transmission devices as a source of transmitting the optical signals and when a destination optical transmission device is specified from among the plurality of optical transmission devices as a destination of the transmitted optical signals, for a plurality of path candidates for transmitting the optical signals from the source optical transmission device to the destination optical transmission device;

sequentially transmitting and receiving, by a transmitting-receiving unit included in each of the source optical transmission device, an intermediate optical transmission device that relays the transmitted optical signals on a path candidate from among the plurality of path candidates, and the destination optical transmission device, the reachable area information from the source optical transmission device to the destination optical transmission device via each of the plurality of path candidates, the source optical transmission device transmitting the reachable area information that is stored in the memory unit thereof to the intermediate optical transmission device that is adjacent to the source optical transmission device;

updating, by an updating unit included in an optical transmission device from among the intermediate optical transmission device and the destination optical transmission device, when the received reachable area information does not contain an identifier of the optical transmission device, the received reachable area information to the reachable area information that is stored in the memory unit of another optical transmission device that is adjacent to the optical transmission device and sent the received reachable area information to the optical transmission device; and obtaining a number of times for which the regenerator is used for each of the plurality of path candidates based on the respective number of times for which the reachable area information is updated at the updating, and selecting, based on each number of times that is obtained, a path for transmitting the optical signals from among the plurality of path candidates.

5. The optical-signal transmission path selecting method according to claim 4, wherein the sequentially transmitting and receiving includes sequentially transmitting and receiving, from the source optical transmission device to the destination optical transmission device, the reachable area information as well as unused wavelength information in a route toward a downstream optical transmission device in a transmission direction of the optical signals, the updating includes updating, when the unused wavelength information received at the sequentially transmitting and receiving does not overlap with unused wavelength information in a route toward the downstream optical transmission device of the optical transmission device, the unused wavelength information received at the sequentially transmitting and receiving to the unused wavelength information of the optical transmission device, and the selecting includes selecting, based on the number of times for which the reachable area information is updated and based on a number of times for which the unused wavelength information is updated, a path for transmitting the optical signals from among the plurality of path candidates.

6. An optical transmission device that transmits optical signals that are wavelength-multiplexed, the optical transmission device comprising:

a reachable area information obtaining unit that obtains reachable area information containing identifiers of other optical transmission devices present in a range within which the optical signals can be transmitted from a source optical transmission device, which is specified as a source of transmitting the optical signals to the optical transmission device, as well as from an intermediate optical transmission device, which relays the transmitted optical signals on a path candidate from among a plurality of path candidates from the source optical transmission device to a destination optical transmission device, without using a regenerator, wherein the optical transmission device from among the intermediate optical transmission device and the destination optical transmission device includes an updating unit that, when received reachable area information does not contain an identifier of the optical transmission device, updates the received reachable area information to the reachable area information that is stored in a memory unit of another optical transmission device that is adjacent to the optical transmission device and sent the received reachable area information to the optical transmission device; and a path selecting unit that obtains a number of times for which the regenerator is used for each of the plurality of path candidates based on the respective number of times for which the reachable area information is updated by the updating unit, and, based on each number of times that is obtained, selects a path for transmitting the optical signals from among the plurality of path candidates.

* * * * *